United States Patent
Yang et al.

(10) Patent No.: US 12,491,725 B2
(45) Date of Patent: Dec. 9, 2025

(54) MEDIA PROCESSING DEVICE AND ASSOCIATED COMPONENTS FOR SPOOL TYPE DETECTION AND/OR STATUS

(71) Applicant: ZEBRA TECHNOLOGIES CORPORATION, Lincolnshire, IL (US)

(72) Inventors: Zi Yang, Guangzhou (CN); Yong Liu, Guangzhou (CN); Zhong Gui Wang, Guangzhou (CN); Yunbo Yuan, Guangzhou (CN)

(73) Assignee: Zebra Technologies Corporation, Lincolnshire, IL (US)

( * ) Notice: Subject to any disclaimer, the term of this patent is extended or adjusted under 35 U.S.C. 154(b) by 13 days.

(21) Appl. No.: 18/677,804

(22) Filed: May 29, 2024

(65) Prior Publication Data

US 2025/0367957 A1 Dec. 4, 2025

(51) Int. Cl.
*B41J 35/36* (2006.01)
*B41J 33/00* (2006.01)
*B41J 35/08* (2006.01)

(52) U.S. Cl.
CPC ............ *B41J 35/36* (2013.01); *B41J 33/003* (2013.01); *B41J 35/08* (2013.01)

(58) Field of Classification Search
CPC ........... B41J 35/36; B41J 33/003; B41J 35/08
See application file for complete search history.

(56) References Cited

U.S. PATENT DOCUMENTS

| 10,399,369 B2 * | 9/2019 | Wong ................. B41J 15/02 |
| 2018/0079233 A1 * | 3/2018 | d'Armancourt ..... B41J 13/0009 |
| 2021/0146700 A1 * | 5/2021 | Flotats Villagrasa ....... B41J 11/009 |
| 2023/0264496 A1 | 8/2023 | Liao et al. |

FOREIGN PATENT DOCUMENTS

| EP | 0401036 B1 * | 5/1995 | ........... B65H 75/182 |
| JP | 2702454 B2 * | 1/1998 | |
| JP | 2000313558 A * | 11/2000 | |
| JP | 2006090759 A * | 4/2006 | |
| JP | 2017503684 | 2/2017 | |

* cited by examiner

*Primary Examiner* — Christle I Marshall

(57) ABSTRACT

A media processing device includes a spindle, a sensor, and a logic circuit. The spindle is configured to support a spool of installed consumable media selected from a plurality of different possible types of consumable media. The spindle includes an encoder wheel having a plurality of encoder patterns. The spindle is configured to translate in an axial direction to accommodate the plurality of different possible types of consumable media. The sensor is configured to sense one of the plurality of encoder patterns based on rotation of the encoder wheel and an axial position of the spindle. The logic circuit is configured to receive a signal from the sensor corresponding to the sensed encoder pattern, determine whether the type of consumable media that is installed based on the signal received from the sensor, and track a usage of the installed consumable media based on the signal received from the sensor.

18 Claims, 17 Drawing Sheets

MEDIA PROCESSING DEVICE AND ASSOCIATED COMPONENTS FOR SPOOL TYPE DETECTION AND/OR STATUS

BACKGROUND

Media processing device can consume media, such as printable media (e.g., labels) and ink ribbons to satisfy printing and/encoding operations. When an available supply of consumable media is depleted or nearly depleted, the consumable media must be replenished in the media processing device for the media processing device to operate properly. In some instances, a media processing device can accept different types of consumable media (e.g., different sized spools of print media in length, width, diameter, thickness, etc., and/or different sized spools of ink ribbon in length, width, diameter, thickness, etc.).

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
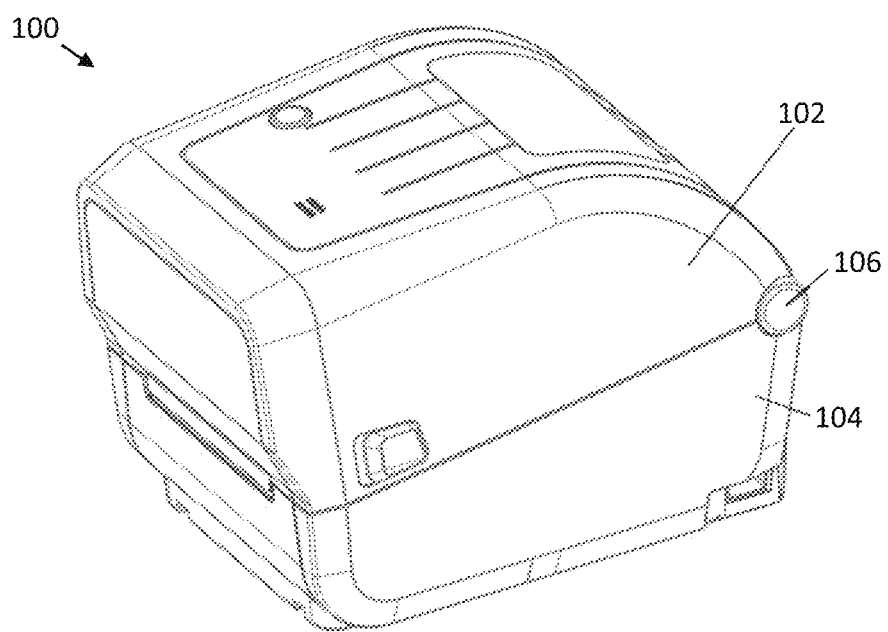
FIG. 1 illustrates an example media processing device in a closed position in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Media processing devices, such as printers and/or RF encoders, may be configured to process consumable media when performing print and/or encode operations. As a non-limiting example, consumable media can include printable and/or encodable label media and/or ink ribbons. The media (e.g., label media and/or ink ribbons) can be held on and drawn from a roll or spool. Media processing devices process (e.g., print, encode, etc.) the printable and/or encodable media by drawing the media from a supply spool and routing the media proximate various processing components (e.g., printhead, RFID reader/encoder, magnetic stripe reader/encoder etc.). Likewise, the ink ribbon can be drawn from a supply spool and routed proximate to various processing components to facilitate a transfer of ink from the ribbon to the printable and/or encodable media as the media is routed proximate to the processing components. Processing the consumable media (e.g., label media and/or ink ribbon) from spools may facilitate a continuous or batch printing process.

Implementation of one or more sensors in the media processing device can aid in determining the type of consumable media that has been installed in the media processing device and can be used to track the usage of the consumable media. When the media processing device allows for different types of consumable media to be installed and used for printing and/or encoding operations, where the different types of consumable media can be have different sized spools (in width, length, and/or media thickness), the sensor of the media processing device may be limited in distinguishing between which type of consumable media is installed and/or may be limited in tracking a usage of such media.

Embodiments of the present disclosure advantageously provide for sensing different types of consumable media that is installed in a media processing device based on an axial position of the spindle and an encoder wheel of the spindle having multiple different encoder patterns, where displacement of spindle in the axial direction can align the different encoder patterns with a sensor. The sensor can detect one of the encoder patterns as the spindle rotates and can provide a signal to a logic circuit that can be used by the logic circuit to determine the type of consumable media that is installed in the media processing device and/or can be used to track a usage of the consumable media by the media processing device.

In accordance with embodiments of the present disclosure, a media processing device is disclosed. The media processing device includes a spindle, a sensor, and a logic circuit. The spindle is configured to support a spool of installed consumable media selected from a plurality of different possible types of consumable media. The spindle includes an encoder wheel having a plurality of encoder patterns. The spindle configured to translated in an axial direction to accommodate the plurality of different possible types of consumable media. The sensor is configured to sense a first encoder pattern of the plurality of encoder patterns based on rotation of the encoder wheel and a first axial position of the spindle when a first type of consumable media of the plurality of different possible types of consumable media is the spool of installed consumable media and to sense a second encoder pattern of the plurality of encoder patterns based on rotation of the encoder wheel and a second axial position of the spindle when a second type of consumable media of the plurality of different possible types of consumable media is the spool of installed consumable media. The logic circuit is configured to: receive a signal from the sensor corresponding to the first encoder pattern or the second encoder pattern; determine whether the first type of consumable media or the second type of consumable media corresponds to the spool of installed consumable media supported by the spindle based on the signal received from the sensor; and track a usage of the consumable media based on the signal received from the sensor.

In accordance with embodiments of the present disclosure, a method is disclosed. The method includes supporting, via a spindle in a media processing device, a spool of installed consumable media. The installed consumable media is selected from a plurality of different possible types of consumable media. The spindle includes an encoder wheel having a plurality of encoder patterns. The spindle configured to translated in an axial direction to accommodate the plurality of different possible types of consumable media. The method also includes sensing, via a sensor of the media processing device, at least one of a first encoder pattern of the plurality of encoder patterns based on rotation of the encoder wheel and an axial position of the spindle when a first type of consumable media of the plurality of different possible types of consumable media is the spool of installed consumable media or a second encoder pattern of the plurality of encoder patterns based on rotation of the encoder wheel and an axial position of the spindle when a second type of consumable media of the plurality of different possible types of consumable media is the spool of installed consumable media; determining, via a logic circuit, whether the first type of consumable media or the second type of consumable media corresponds to the spool of installed consumable media supported by the spindle based on a signal received from the sensor corresponding to the first encoder pattern or the second encoder pattern; and tracking, via the logic circuit, a usage of the consumable media based on the signal. In accordance with embodiments of the present disclosure, a non-transitory computer-readable medium is disclosed. The non-transitory computer-readable medium stores instruction that when executed by a logic circuit causes the logic circuit to perform the foregoing method.

In accordance with embodiments of the present disclosure, the encoder wheel includes two sets of prongs disposed circumferentially about the encoder wheel and extending axially from the encoder wheel.

In accordance with embodiments of the present disclosure, the first encoder pattern is defined by a combination of the first and second prongs and the second encoder pattern is defined by the second prongs.

In accordance with embodiments of the present disclosure, a biasing member is configured to urge the spindle towards a first axial position.

In accordance with embodiments of the present disclosure, the spindle comprises a spool engagement member and the encoder wheel is integrally formed with the spool engagement member.

In accordance with embodiments of the present disclosure, the spindle includes a tensioning member configured to engage the spool engagement member to provide a counterforce that impedes rotation of the spool engagement member, a first biasing member that urges the tensioning member towards the spool engagement member, and/or a second biasing member that urges the spool engagement member towards the tensioning member.

In accordance with embodiments of the present disclosure, the tensioning member includes a friction member and the spool engagement member includes a friction surface. The first biasing member and the second biasing member generate opposing forces to maintain contact between the friction member and the friction surface when the spindle is in the first axial position and the second axial position.

In accordance with embodiments of the present disclosure, the logic circuit tracks the usage of the consumable media by estimating a remaining length of the consumable media on the installed spool.

In accordance with embodiments of the present disclosure, the consumable media of the installed spool is an ink ribbon.

In accordance with embodiments of the present disclosure, usage of the consumable media can be tracked by determining a quantity of revolutions of the installed spool based on the signal; and estimating a remaining length of the consumable media on the installed spool based on a total length of the consumable media and the quantity of revolutions of the installed spool.

Figure 2:
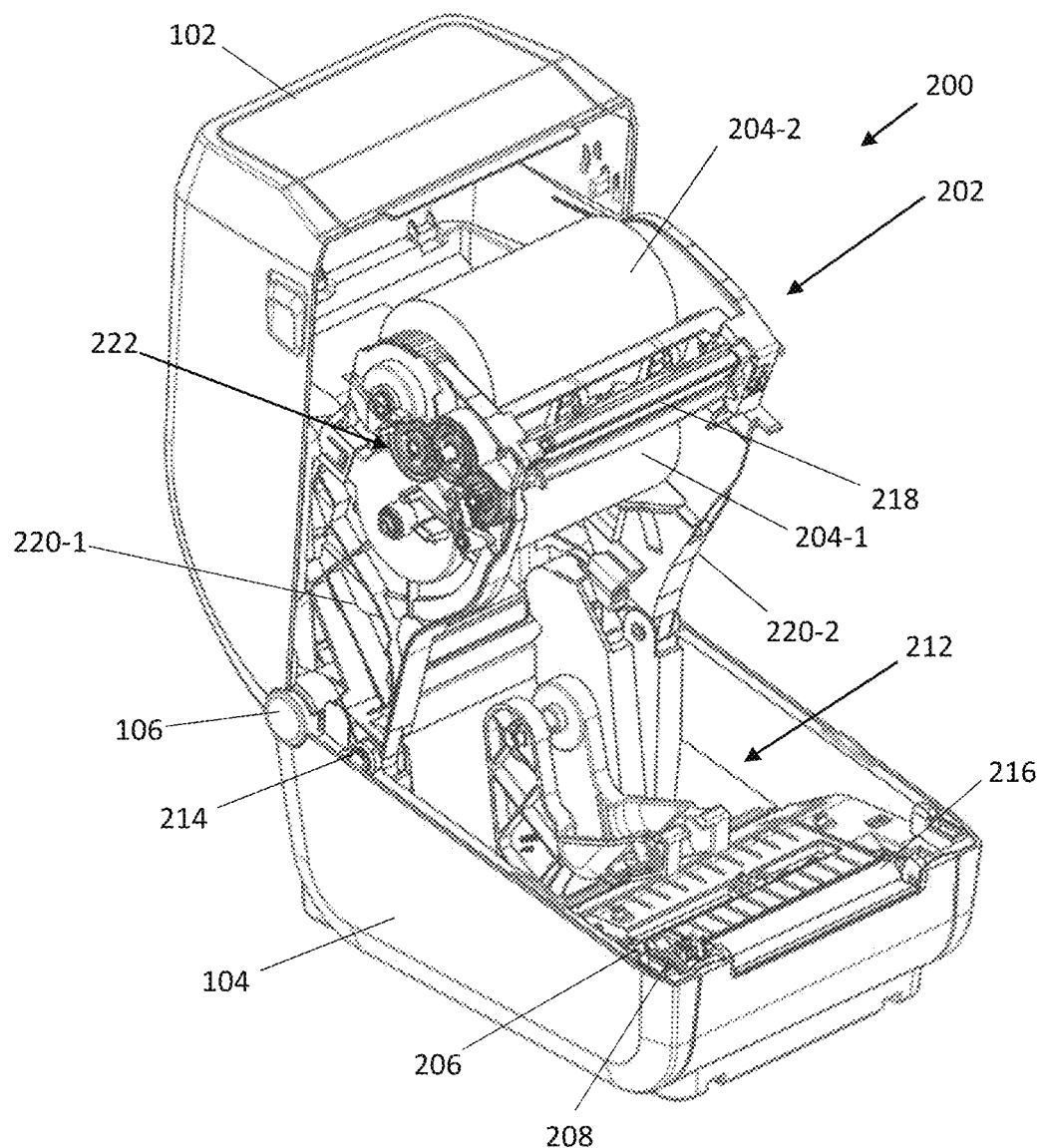
FIG. 2 illustrates the example media processing device of FIG. 1 in an open position in accordance with embodiments of the present disclosure.

FIGS. 1 and 2 illustrate a media processing device 100, e.g., in the form of a printer, in accordance with embodiments of the present disclosure. While an illustrative embodiment of the media processing device has been depicted as a printing device, in accordance with embodiments of the present disclosure the media processing device 100 can be implemented as a media encoder, a label applicator, a laminator, or other media processing device. The media processing device 100 includes a housing defined by a lid assembly 102 and a base assembly 104. The lid assembly 102 and the base assembly 104 can be selectively movable relative to each other between a closed position (e.g., as shown in FIG. 1) and an open position (e.g., as shown in FIG. 2). In the closed position, the lid assembly 102 is secured to the base assembly 104. When the lid assembly 102 is in the closed position, the lid assembly 102 can latch to the base assembly 104 and the lid assembly 102 can require actuation to unlatch the lid assembly 102 from the base assembly 104 before the media processing device 100 can be moved to the open position. The lid assembly 102 may be pivotably attached to the base assembly 104 along a hinge 106, which may be located, for example, along a back side of the printer. In the illustrated embodiment, the lid assembly 102 is configured, when opened, to rotate about the hinge 106 to the open position.

When the media processing device 100 is in the open position, a cavity 200 and/or components supported within the housing of the media processing device 100 can be observed and/or accessible. As an example, referring to FIG. 2, when the media processing device is in the open position a ribbon frame 202 and a lower frame 212 can be seen. The ribbon frame 202 presents a ribbon cartridge from within the printer 100 for removal or to allow for accessible installation of the ribbon cartridge. As an example, the ribbon frame 202 can be configured to rise from within the base assembly 104 in response to the media processing device moving from the closed position to the open position. When the media processing device 100 moves from the open position to the closed position, the ribbon frame 202 descends to fit within the housing formed by the lid 102 and base 104 in the closed position. The ribbon frame 202 is configured to rotate around a pivot point 214 when moving between the open and closed position. As can be seen in FIG. 2, the pivot point 214 is mounted to the lower frame 212, however it should be known that the pivot point 214 can also be integral to the hinge 106 or mounted to the lid assembly 102. The ribbon frame 202 also aligns the ribbon cartridge within the printer 100 so that a printhead of the printer 100 can reliably interact with the ribbon cartridge and the ribbon to facilitate a transfer of ink from the ribbon to printable and/or encodable media. The lower frame 212 can be located within the base assembly 104 to provide rigidity within the base assembly 104 and provide locations for other elements of the media processing device 100 to connect to the base assembly 104. For example, the hinge 106 may be connected to the base assembly 104 via the lower frame 212. Media holders, a platen, or other elements common to a media processing 100 may also be operatively coupled and/or support by the lower frame 212 of the base assembly 104.

The example ribbon frame 202 of FIG. 2 supports a supply spool 204-1 and a take up spool 204-2. The supply spool 204-1 is loaded into the printer 100 with a new supply of ribbon and the take up spool 204-2 collects the spent ribbon after printing. In some embodiments, the spools 204-1 and 204-2 can be form or be included in a cartridge. When new ribbon is loaded into the printer 100, the ribbon is loaded from the supply spool 204-1 around the edge of the printhead 218 and around to the take up spool 204-2.

Referring to FIG. 2, a drive gear 206 can be housed in the base 104. The drive gear 206 can be operatively coupled to a motor (e.g., motor 1308 shown in FIG. 13) disposed in the base 104, e.g., directly to a drive shaft of the motor or via a drive train (including one or more gears, belts, clutches, etc.). In some embodiments, the motor can also drive the platen 216, e.g., via the drive gear 206 and/or a platen gear 208, to advance media within the media processing device 100. In some embodiments, a separate motor can be used to drive the platen 216, e.g., via the platen gear 208. The drive gear 206 can be meshed to a spool gear assembly operatively coupled to the frame 202 and the spools 204-1 and 204-2 such that, for example, the rotation of the spools 204-1 and 204-2 is in congruence with rotation of the drive gear 206, and for embodiments, where the same motor drives the drive gear 206 and the platen 216, the rotation of the spools 204-1 and 204-2 can be in congruence with the rotation of the drive gear 206 and the platen 216. This allows the platen 216 to drive the media past the printhead 218 while maintaining tension on the ribbon passing between the spools 204-1 and 204-2. For example, when the lid 102 is in the closed position, the printhead 218 and the platen 216 can form a nip and rotation of the platen 216 can advance the media within the media processing device 100 past the printhead 218. When the lid 102 is in the closed position and the ribbon frame 202 is lowered into the closed position, the spool gear assembly engages with the drive gear 206. The gear configuration of the media processing device 100 can allow for the platen 216 to be driven via the platen gear 208, wherein the platen 216 is configured to drive media and ribbon past the printhead 218 for processing. As the platen 216 drives the media and ribbon, the spool gear assembly 222 allows for the platen 216 and the spools 204-2 and to rotate together such that ribbon is wound on to the spool 204-2 after passing the platen 216.

Figure 3:
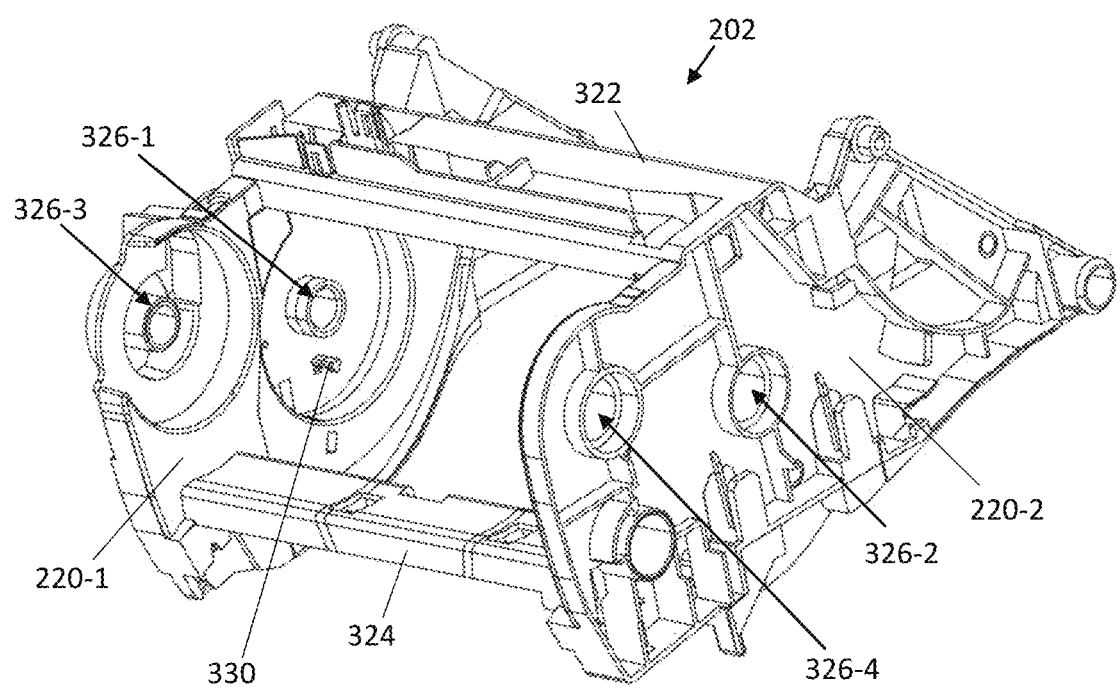
FIG. 3 is perspective view of an example ribbon frame in accordance with embodiments of the present disclosure.

Referring to FIGS. 2-5, the frame 202 includes opposingly spaced side walls 220-1 and 220-2, joined by a cross-bar 322 which forms the upper-most portion of the frame 202 and a cross bar 324 disposed proximate a lower most portion of the frame 202. The printhead 218 can be disposed on the cross bar 324. Circuitry (e.g., at least a portion of circuitry 1300 shown in FIG. 13 including a sensor 908) can be supported by the cross bar 322 of the frame 202. The side walls 220-1 and 220-2 can include openings 326-1 to 326-4 configured to receive and retain spindle 426-1 to 426-4, respectively. The opening 326-1 can be opposingly spaced from the opening 326-2 and the opening 326-3 can be opposingly spaced from the opening 326-4. In an example embodiment, the spindle 426-1 can be received and retained by the opening 326-1, the spindle 426-2 can be received and retained by the opening 326-2, the spindle 426-3 can be received and retained by the opening 326-3, and the spindle 426-4 can be received and retained by the opening 326-4. As shown in FIG. 3, a tab 330 can extend inwardly from the side wall 220-1 towards the side wall 220-2. The tab 330 can be position proximate to the opening 326-1 and can be configured to provide anchor point for a biasing member.

The ribbon supply spool 204-1, when present, is supported by the frame 202 via spindle 426-1 and 426-2, and the ribbon take-up spool 204-2, when present, is supported by the frame 202 via the spindle 426-3 and 426-4. In the example embodiment, the cross bar 322 is configured to be generally aligned with the ribbon supply spool 204-1 when the ribbon supply spool 204-1 is supported by the frame 202. The sensor (e.g., sensor 908 shown in FIGS. 9-10 and 13) is positioned and oriented towards the ribbon supply spindle 426-1 such that the sensor (e.g., sensor 908 shown in FIGS. 9-10 and 13) is configured to sense a position of the ribbon spindle 426-1 and/or a rotation of the ribbon spindle 426-1.

Referring to FIGS. 6-10, the spindle 426-1 includes a spool engagement member 610 operatively coupled to a tensioning member 640, e.g., via a fastener 660, such as a screw. The spool engagement member 610 can be configured to rotate relative to the tensioning member 640 and the tensioning member 640 can be configured to provide a counterforce that impedes the rotation of the engagement member relative to the tensioning member. As an example, the tensioning member 640 can include a surface that engages the spool engagement member 610 to generate friction between the members 610 and 640.

The spool engagement member 610 can have a spool facing surface 612 having a generally circular perimeter about a center axis 602. An opening 614 can be formed about the center axis 602 in the spool engagement member 614 and the opening 614 can be configured to receive a portion of the tensioning member 640 and the fastener 660 to operatively couple the spool engagement member 610 to the tensioning member 640. Spool supports 616 and 618 can extend outwardly from the spool facing surface 612 axially relative to the center axis 602 and can extend circumferentially about the center axis 602 such that the spool supports 616 and 618 are concentrically aligned with the center axis 602. The spool supports can be configured to engage spools having different inner core diameters. As an example, a diameter of the spool support 616 can be greater than a diameter of the spool support 618. The spool support 616 can be configured to engage a spool having a first specified inner core diameter (e.g., an outer diameter of the spool support 616 can be slightly less than the first specified inner core diameter of the spool such that the spool support 616 extends into an interior of the core) and the spool support 618 can be configured to engage a spool having a second specified inner core diameter (e.g., an outer diameter of the spool support 618 can be slightly less than the second specified inner core diameter of the core of the spool such that the spool support 616 extends into an interior of the core). In some examples, the spool supports 616 and 618 can include radially extending portions 620 and 622, respectively. The radially extending portions 620 can be diametrically opposed from each other and the radially extending portions 622 can be diametrically opposed from each other. In some examples, the cores of the spools to received by the spool supports 616 and 618 can be split cores defining gaps and/or can include notches at the terminal ends of the core and the radially extending portions 620 and/or 622 can extend into the gaps or notches in the split cores to lock the rotation of the spool engagement 610 to the rotation of a spool (e.g., so that the spool engagement member and the spool rotate in unison).

The spool engagement member 610 can also include a textured portion 624 (e.g., scalloped, crenated, otherwise texture, etc.) extending circumferentially about the perimeter of the spool facing surface 612. The textured portion 624 of the spool engagement member 610 can provide a surface that can be grasped by (or interacted with) one or more digits of user to facilitate manual rotation of the spool engagement member 610. An encoder wheel 626 can extend axially from the textured portion 624 away from the spool facing surface 612 and can extend circumferentially about the center axis 602. The encoder wheel 626 define multiple encoder patterns (e.g., encoder patterns 1102 and 1202 shown in FIGS. 11-12). As an example, the encoder wheel 626 can have a first portion 628 defining a first encoder pattern (e.g., encoder pattern 1102 shown in FIG. 11) circumferentially about the center axis 602 and a second portion 630 defining a second encoder pattern (e.g., encoder pattern 1202 shown in FIG. 12) circumferentially about the center axis 602. In the present example, the first portion 628 can extend axially from the textured portion 624 and the second portion 630 can extend axially from the first portion 628. The first and second encoder patterns are different from each other. In some examples, the first pattern can include elements of the second pattern such that there is at least some overlap between the first and second patterns. In some examples, the first and second patterns can be mutually exclusive such that there is no overlap between the first and second patterns.

In the present example, projections 632 and 634 can axially extend from textured portion 624. The projections 634 can have a greater length than the projections 632. As an example, the projections 632 can extend axially from textured portion 624 a distance that corresponds to the first portion 628 such that the projections do not extend into the second portion 630 and the projections 634 can extend axially from textured portion 624 a distance that corresponds an aggregated distance of the first portion 628 and the second portion 630 such that the projections 634 extend through the first and second portions 628 and 630. For the present example, the first encoder pattern can be formed by a combination of the first and second projections 632 and 634 and the second encoder pattern can be formed by the second projections 634. A rail 636 can extend circumferentially about the center axis between the first and second portions 628 and 630 to provide support and rigidity to the projections 632 and 634. As an example, the projections 632 and 634 can be integrally formed with the rail 636, where the projections 632 extend from the textured portion 624 and terminate at the rail 636 and the projections 632 extend from the textured portion 624 beyond the rail 636.

Still referring to FIGS. 6-10, the tensioning member 640 can include a first shaft portion 642 that includes a detent 644. The shaft portion 642 and detent 644 are configured to be received and retained by the opening 326-1 of the frame 202 (e.g., shown in FIG. 3). For example, once the shaft portion is inserted through the opening 326-1, the detent 644 can return to its normal position to secure the shaft portion 642 within the opening 326-1. The shaft portion 642 can be configured and dimensioned to rotate within the opening 326-1, e.g., about the center axis 602. The tensioning member 640 can include a shaft portion 646 including an opening 648 disposed a tip of the shaft portion 646. The shaft portion 646 can be configured to be received by and extend through the opening 614 in the spool engagement member 610 and the fastener 660 can be fastened to the tensioning member 640 via the opening 648 in the shaft portion 646. A friction member 650 can be disposed about the first and/or second shafts 642 and/or 646 the first shaft portion 642 and the second shaft portion 646. The friction member 650 can be a disk that is configured to nest within the spool engagement member 610 and can come in contact with a friction surface 656 of the spool engagement member 610. The friction surface 656 is disposed opposite the spool facing surface 612 of the spool engagement member 610. The friction member 650 can include raised friction pads 652 to engage the friction surface 610 to provide a counterforce (a friction force) that impedes rotation of the spool engagement member 610 relative to the tensioning member 640. In one example, the friction member 650 and the friction surface 656 form a clutch or a braking mechanism. A force can be applied to the spool engagement member 610 to overcome the counterforce to allow the spool engagement member 610 to rotate relative to the tensioning member 640. For example, as the consumable media (e.g., an ink ribbon) is pulled from a spool supported by the spool engagement member 610, the force with which the consumable media is pulled can be sufficient to overcome the frictional force and rotate the spool engagement member 610 relative to the tension engagement member 640. The friction member 650 can also include a tab 654 that provides an anchor for a biasing member 662 as described herein.

Figure 4:
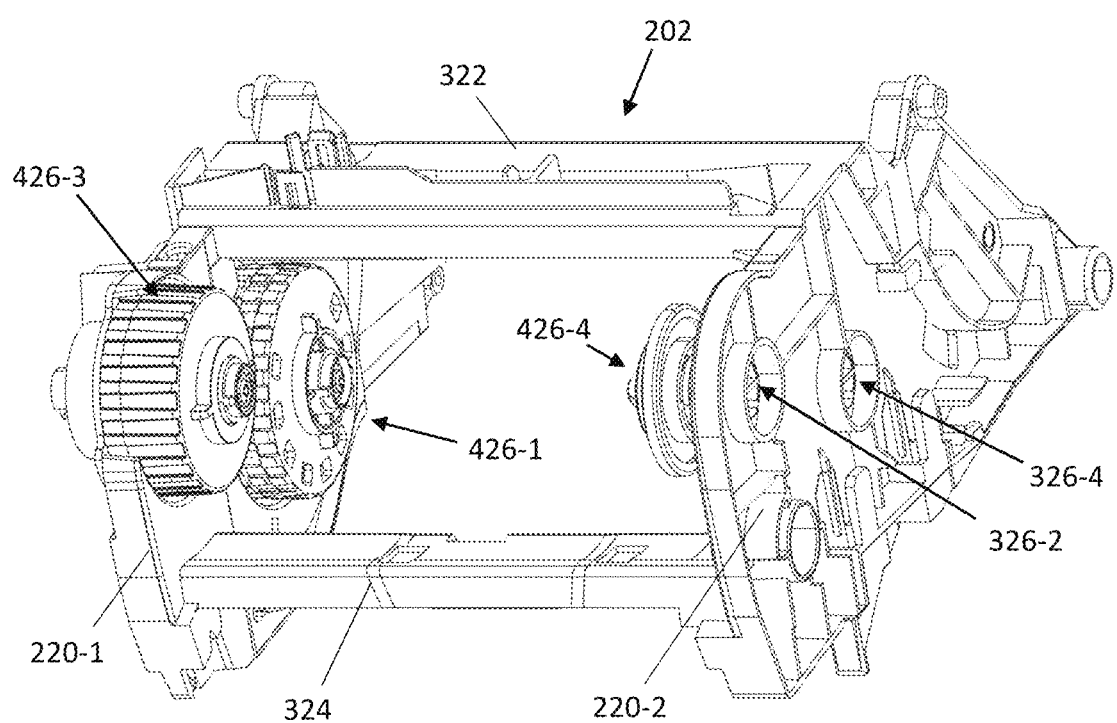
FIG. 4 is perspective view of the example ribbon frame of FIG. 3 including example spindles in accordance with embodiments of the present disclosure.
Figure 5:
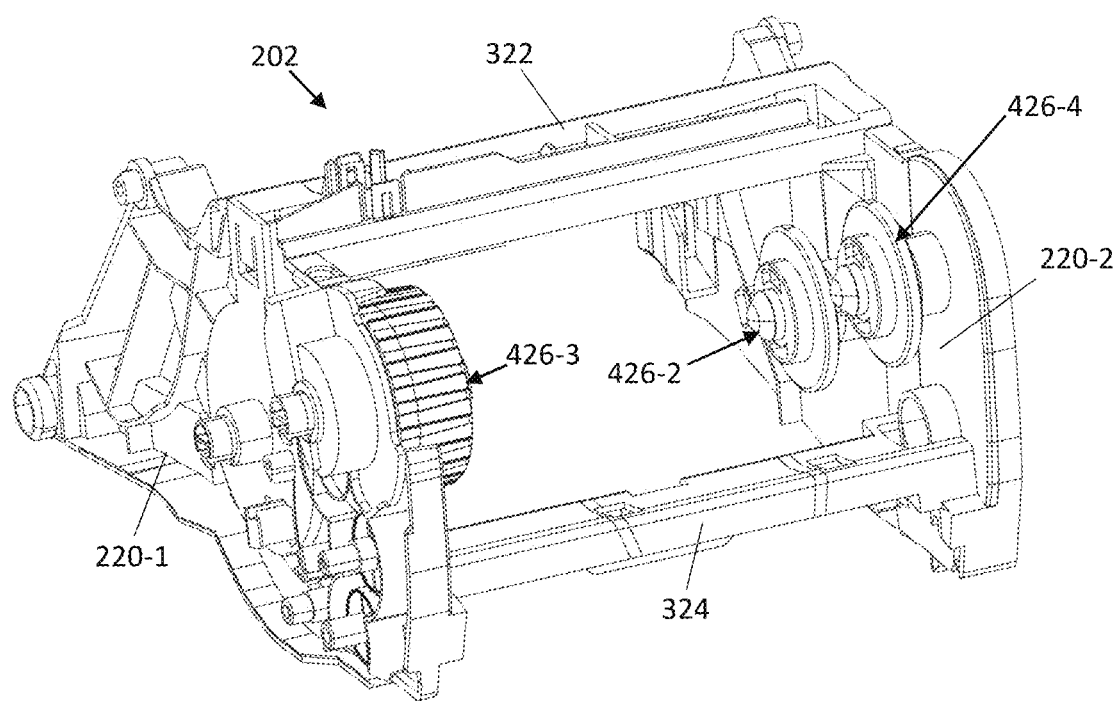
FIG. 5 is another perspective view of the example ribbon frame of FIG. 3 including the example spindles in accordance with embodiments of the present disclosure.
Figure 6:
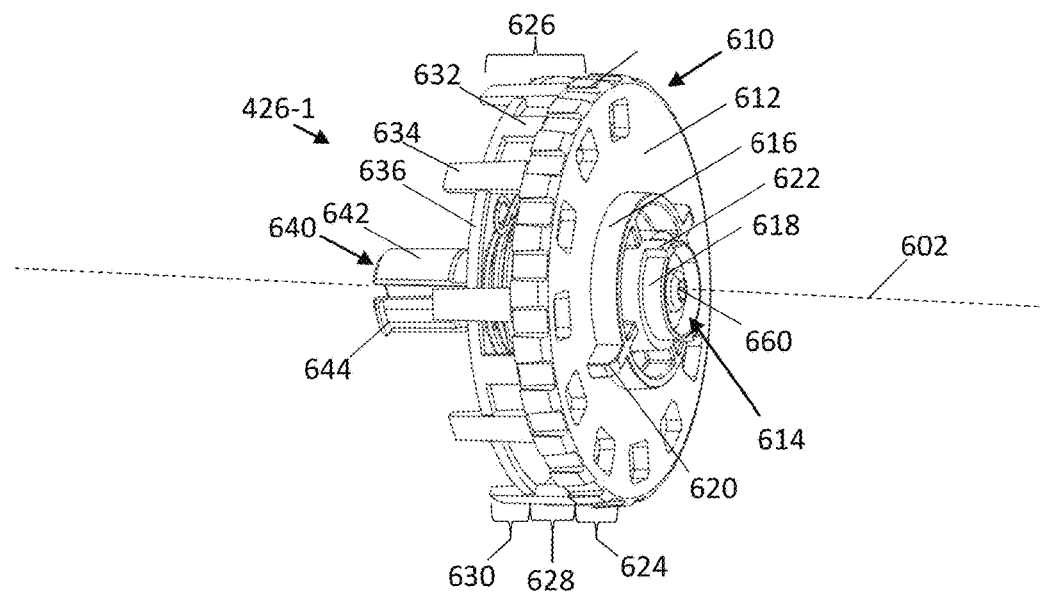
FIG. 6 illustrates one example spindle in accordance with embodiments of the present disclosure.

To bias the spool engagement member towards the tensioning member and to bias the tensioning member 640 towards the spool engagement member 610, the spindle 426-1 can include biasing members 664 and 666. As an example, the biasing member 664 can be a coil spring, which can be bounded by washers 670 and 672 and secured within the opening 614 by the fastener 660. The biasing member 664 can be compressed between the fastener 660 and a surface of the spool engagement member 610 within the opening 614. In one example, the biasing member 664 can surround the shaft portion 646 of the tensioning member 640 when the tensioning member 640 is inserted through the opening 614. The force of the biasing member against the fastener 660 (which is attached the tensioning member 640 can push against the spool engagement member to urge the spool engagement member towards the tensioning member 640. The biasing member 666, which can be a coil spring can be disposed about the shaft portion 642 and when the spindle 426-1 is mounted on the frame 202 (e.g., as shown in FIGS. 4-5), the biasing member 666 can be disposed between the side wall 220-1 of the frame 202 and the friction member 650 of the tensioning member 640 apply a force to the tensioning member 640 to urge the tensioning member towards the spool engagement member 610 so that the friction pads 652 of the friction member 650 are in contact with the friction surface of the spool engagement member 610. Additionally, the biasing member 666 can enable the spindle (the tensioning member 640 and/or the spool engagement member 610) to move in an axial direction towards or away from the side wall 220-1 to accommodate spools of different widths or spools having cores with different axial lengths.

Figure 7:
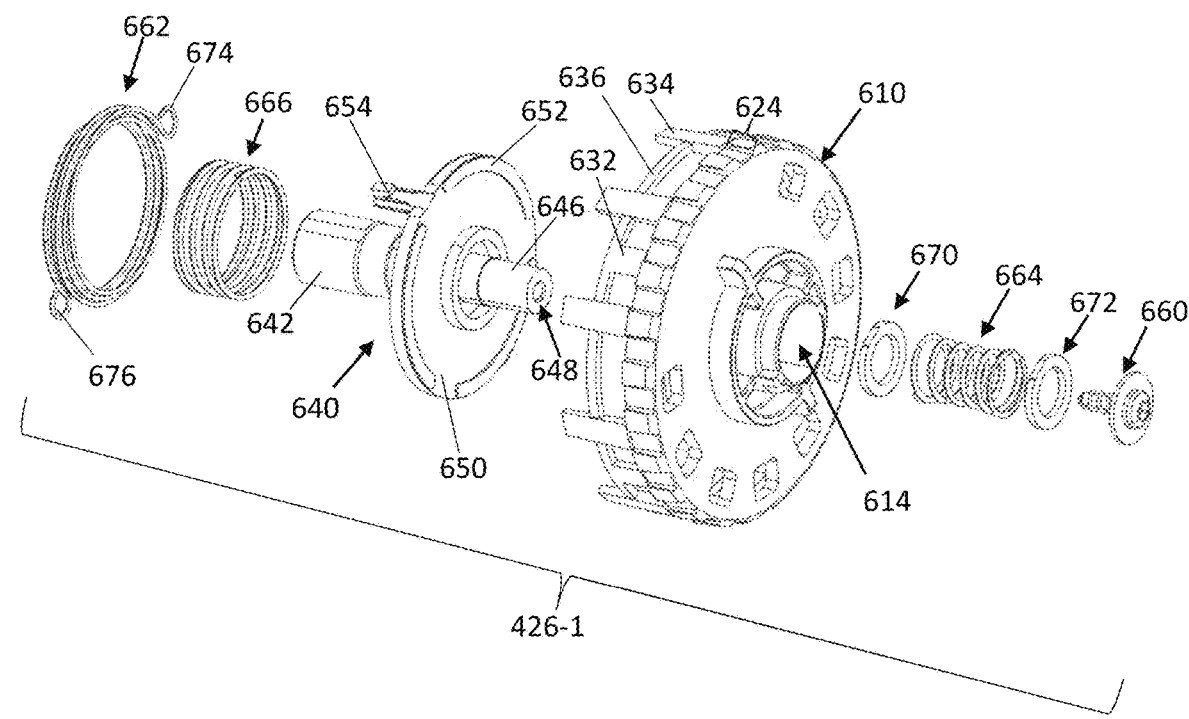
FIG. 7 is an exploded view of the example spindle of FIG. 6 in accordance with embodiments of the present disclosure.
Figure 8:
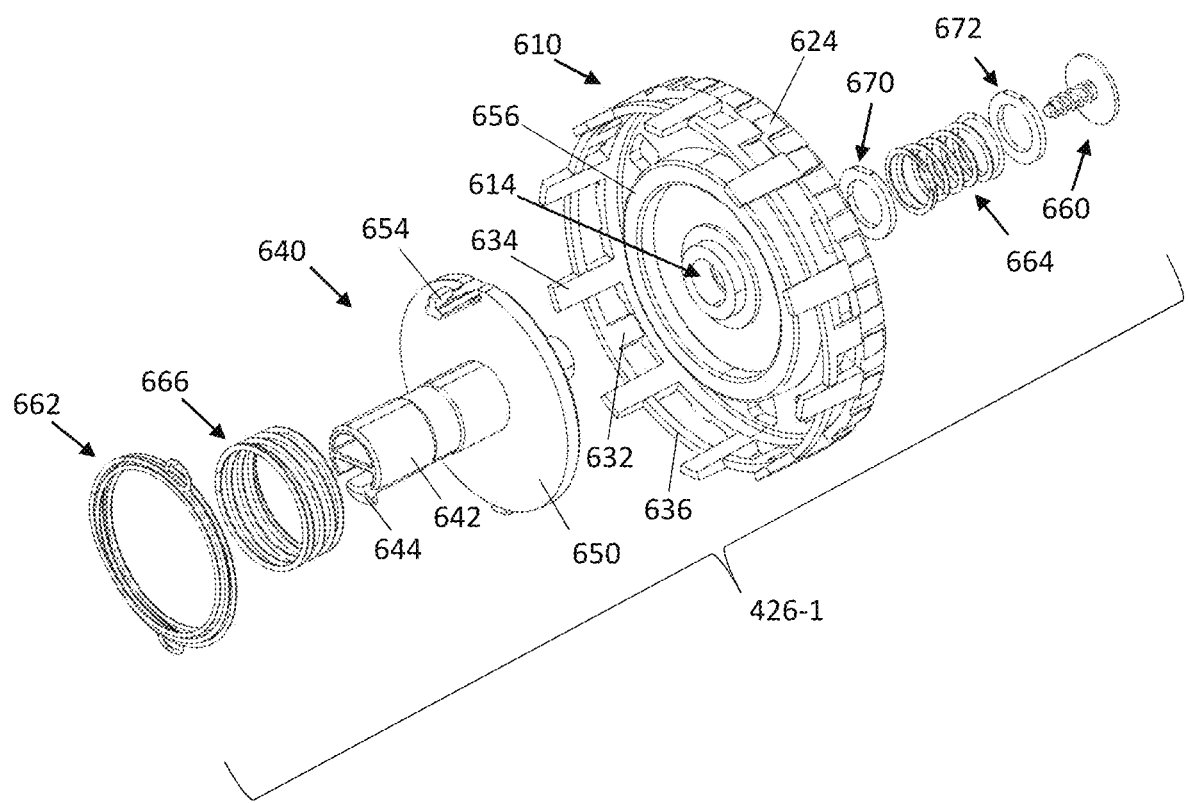
FIG. 8 is another exploded view of the example spindle of FIG. 6 in accordance with embodiments of the present disclosure.

The biasing member 662 can be a torsion spring having anchors 674 and 676. One of the anchors 674 and 676 can be operatively coupled to the tab 330 on the frame 202 (FIG. 3) and the other one of the anchor springs 674 and 676 can be operatively coupled to the tab 654 on the tensioning member 640 (FIG. 7). As an example, the anchor 674 can be operatively coupled to the tab 330 of the frame 202 (FIG. 3) and the anchor 676 can be operatively coupled to the tab 654 of the tensioning member 640. In an example operation, when the spindle 426-1 is received and retained by the frame 202 (e.g., shown in FIGS. 4-5) and the tensioning member 640 rotates relative to the frame 202, the biasing member 662 can generate a torque or twisting force in the opposite direction. When the spool engagement member 610 begins to rotate (e.g., in response to media being pulled from a spool supported by the spool engagement member 610, the spool engagement member 610 and the tensioning member 640 can begin to rotate in unison. As the tensioning member 640 rotates, the torque (e.g., a counterforce) generated by the biasing member 662 can increase. When the torque generated by the biasing member exceeds the frictional force between the tensioning member 640 and the spool engagement member 610, the tensioning member 640 can cease to rotate and the spool engagement member 610 can continue rotating. This arrangement can ensure that a sufficient back tension is applied to the consumable media being pulled from the spool.

Figure 9:
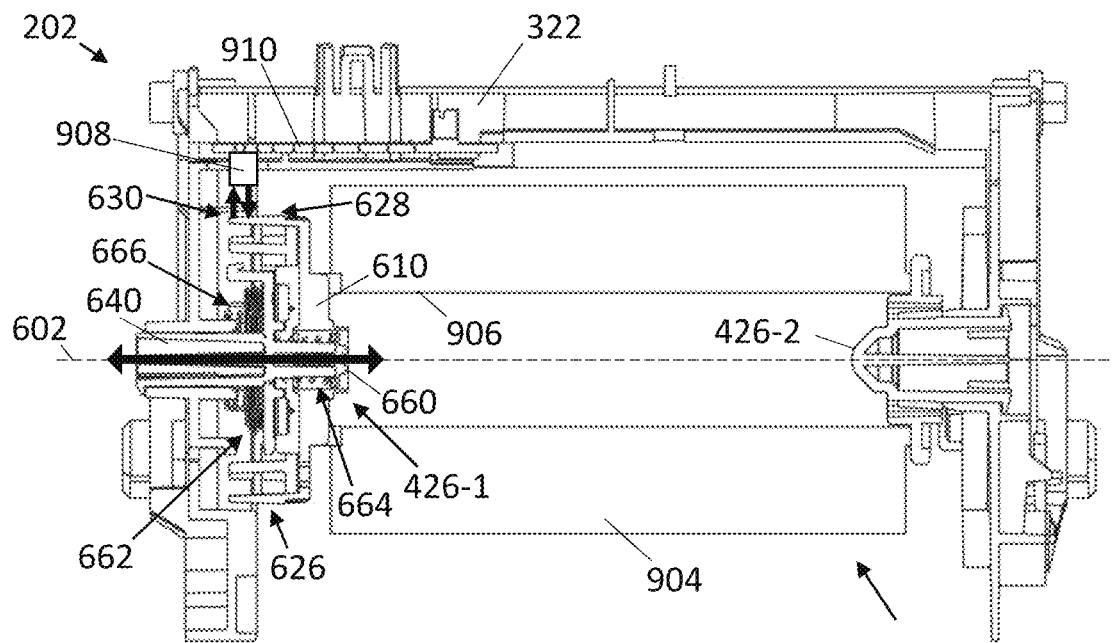
FIG. 9 is a cross-sectional view of a ribbon frame supporting an example spool via spindles in accordance with embodiments of the present disclosure.
Figure 11:
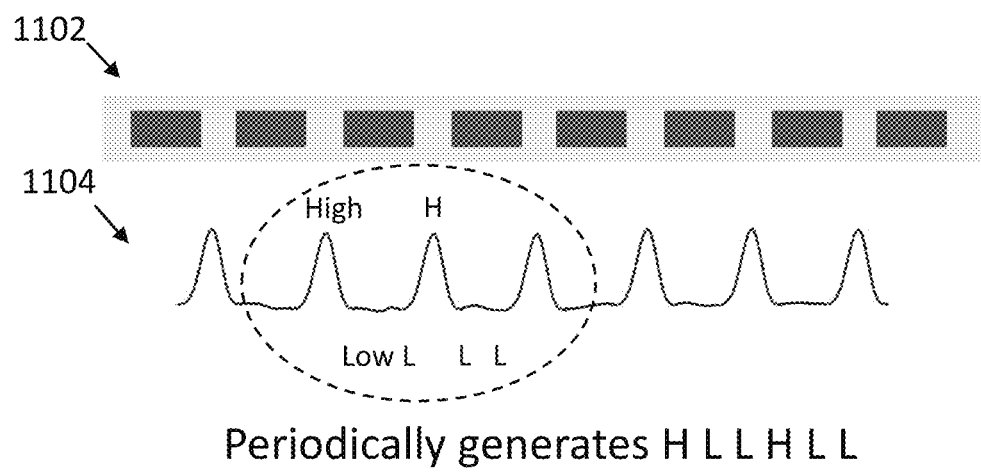
FIG. 11 illustrates one example encoder pattern and corresponding output signal in accordance with embodiments of the present disclosure.

Referring to FIGS. 9 and 11, which depicts a cross sectional view showing an example spool 902 of a consumable media (e.g., a supply of ink ribbon 904) supported by the frame 202 via the spindle 426-1 and the spindle 426-2, the spool 902 can have a core 906 with a specified diameter and an axial length. The spindles 426-1 and 426-2 can extend into the interior of the core 906 to secure the spool 902 to the frame 202. Positioning the core 906 onto the spindles 426-1 and 426-2 can cause the spindle 426-1 to have a first position in the axially direction that aligns a sensor 908, e.g., disposed on a circuit board 910 supported on the cross bar 322, with the second portion 630 (having the second encoder pattern 1102) of the encoder wheel 626 formed by the spool engagement member 610 of the spindle 426-1. The sensor can be an optical sensor, a proximity sensor, or another type of sensor. The sensor 908 can sense the second encoder pattern 1102 and output a signal 1104 having a waveform that corresponds to the second encoder pattern 1102. The spindle 426-1 can move axially on the frame based on an operation of the biasing member 666 and an opposing force of the spool 902 so that the encoder wheel 626 moves in the axial direction to a specified position relative to the sensor 908 based on the length and/or diameter of the core 906 of the spool 902.

Figure 10:
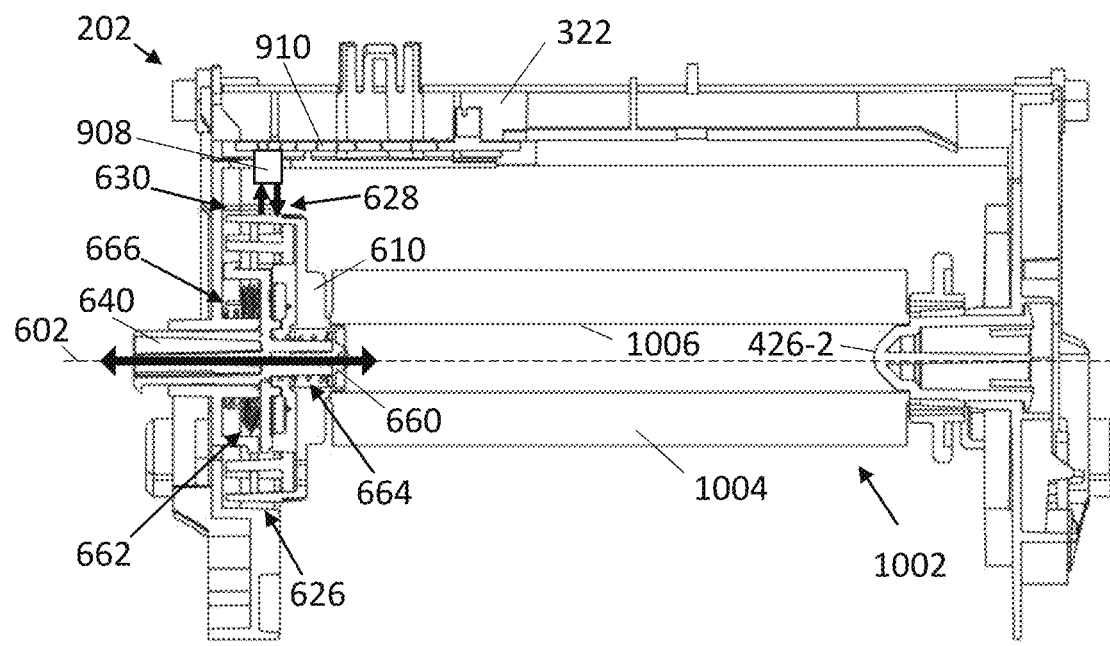
FIG. 10 is a cross-sectional view of a ribbon frame supporting another example spool via spindles in accordance with embodiments of the present disclosure.
Figure 12:
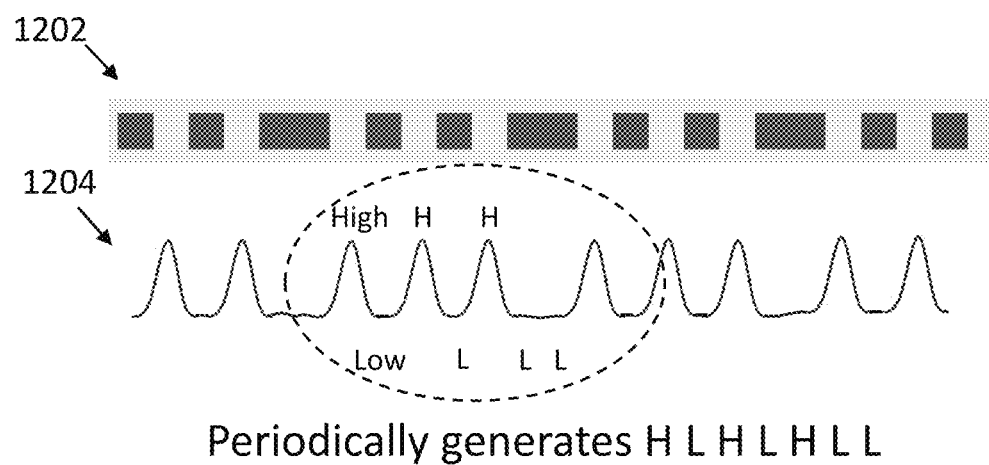
FIG. 12 illustrates another example encoder pattern and corresponding output signal in accordance with embodiments of the present disclosure.

Referring to FIGS. 10 and 12, which depicts a cross sectional view showing an example spool 1002 of a consumable media (e.g., a supply of ink ribbon 1004) supported by the frame 202 via the spindle 426-1 and the spindle 426-2, the spool 1002 can have a core 1006 with a specified diameter and an axial length. The spindles 426-1 and 426-2 can extend into the interior of the core to secure the spool 1002 to the frame 202. Insertion of the core 1006 onto the spindles 426-1 and 426-2 can cause the spindle 426-1 to have a second position in the axially direction that aligns the sensor 908, e.g., disposed on a circuit board 910 supported on the cross bar 322, with the first portion 628 (having the first encoder pattern) of the encoder wheel 626 formed by the spool engagement member 610 of the spindle 426-1. The sensor 908 can sense the first encoder pattern 1202 and output a signal 1204 having a waveform that corresponds to the second encoder pattern 1202.

Referring to FIGS. 9-10, in one example, the cores 906 and 1006 of the supply spools 902 and 1002, respectively, can have different lengths (measure in the axial direction) and/or different diameters and the spindle 426-1 can move in the axial direction to accommodate the different sized cores 906 and 1006, as illustrated, e.g., in FIGS. 9-10. Likewise, the consumable media on the spools can have different width (measure in the axial direction) and different web lengths wound about the cores 906 and 1006. Thus, the frame 202, and spindles 426-1 to 426-4 can be configured to accommodate different spools of consumable media having different dimensions and characteristics.

Figure 13:
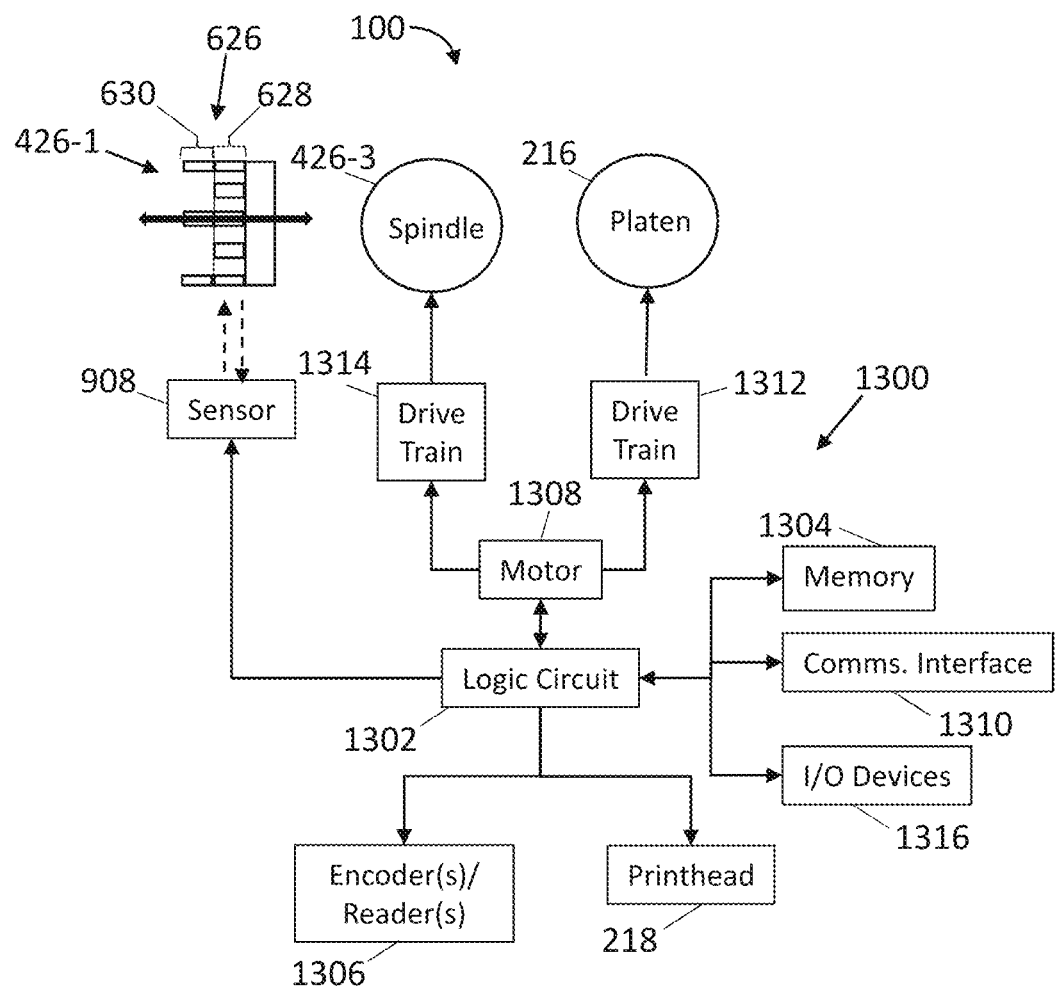
FIG. 13 is a block diagram illustrating example circuitry in accordance with embodiments of the present disclosure.

FIG. 13 is a block diagram illustrating example circuitry 1300 of an embodiment of the media processing device 100 in accordance with embodiments of the present disclosure. As shown in FIG. 13, and with reference to FIGS. 1-10, the circuitry 1300 can includes a logic circuit 1302 (e.g., such as a processor, FPGA, ASIC, or other logic circuit); a non-transitory computer-readable medium, e.g., in the form of memory 1304, a radiofrequency identification (RFID)/near-field communications (NFC) encoder 1306, a motor 1308, a communications interface 1310, I/O device 1316, the sensor 908, and the printhead 218. The logic circuit 1302 can send instructions and/or data to and/or receive instructions and/or data from another device (e.g., via the communications interface 1310) and/or via I/O devices 1316 (e.g., buttons, switches, touch displays, microphone, pointing device, etc.). The logic circuit 1302 can execute code stored in the memory 1304 to control the components of the media processing device 100 to perform one or more media processing functions, for example, in response to instructions and/or data received from another device and/or via the I/O device 1316. As one example, the logic circuit 1302 can execute code in the memory 1304 to drive the motor 1308, communicate with other devices via the communication interface 1310, receive or output information via the I/O device 1316, control the printhead 218, and/or control the RFID/NFC encoder 1306. As an example, for a printing and/encoding operation, the processor 1302 can drive the motor 1308 to cause the platen 216 to rotate via a drive train 1312 to feed print media past the printhead 218 and/or cause the spindle 426-3 to rotate via a drive train 1314 to feed an ink ribbon past the printhead 218 and/or the RFID/NFC encoder 1306. The drive trains 1312 and/or 1314 can include driveshafts, gears, belts, clutches, and/or other components configured to transfer motion from the motor 1308 to the platen 216 and/or the spindle 426-3. As one example, the drive train 1312 can include, e.g., drive gear 206 and platen gear 208 and the drive train 1314 can include, e.g., drive gear 206 and spool gear assembly 222. As the print media and the ink ribbon are fed past the printhead 218, the logic circuit 1302 can control the printhead 218 to selective transfer ink from the ink ribbon to the print media and/or as the media is fed past the RFID/NFC encoder 1306, the encoder 1306 can encode an RF tag included with the media.

As the spindle 426-3 is driven to rotate via the motor 1308, a take-up spool supported by the spindle 426-3 and 426-4 on the frame 202 can rotate to wind the ink ribbon about the take up spool and pull the ink ribbon from a spool supported by the spindles 426-1 and 426-2, which causes the spool to rotate. The sensor 908 can sense one of the encoder patterns (e.g., the first pattern or the second pattern) from the encoder wheel 626 of the spool engagement member of the spindle 426-1 as the spool engagement member rotates in response to the unwinding of the ink ribbon. The sensor 908 can output a signal corresponding to the sensed encoder pattern to the logic circuit 1302. The logic circuit 1302 can process the signal output from the sensor 908 to determine a type of consumable media (e.g., a type of ink ribbon) that is supported by the spindles 426-1 through 426-4. As an example, if the signal corresponds to the first encoder pattern, the logic circuit 1302 can be programmed to determine that the consumable media (e.g., ink ribbon) is a first type of consumable media (e.g., a first type of ink ribbon) and if the signal corresponds to the second encoder pattern, the logic circuit 1302 can be programmed to determine that the consumable media (e.g., ink ribbon) is a second type of consumable media (e.g., a second type of ink ribbon). Using this information, the logic circuit 1302, can, for example, determine a total length of the consumable media, a thickness of the consumable media, and/or other parameters or characteristics of the consumable media. As another example, the logic circuit can track a number of revolutions the encoder wheel makes based on the encoder pattern being sensed by the sensor 908 and can use this information in combination with information determined about the type consumable media that the spindle 426-1 is supporting, the total length of the consumable media wound about a spool, and/or a thickness of the media to determine a quantity, percentage, or length of media remaining on the spool, a quantity, percentage, or length of media that has been used (e.g., wound on the take-up spool), a quantity of media units remaining (e.g., in the case where the consumable media is a web of individual labels), when the media is depleted or near depletion (e.g., less than a specified amount of consumable media remains on the spool), and/or can determine other information about the consumable media. As another example, based on a determination that the consumable media is depleted or near depletion (e.g., less that a specified amount of media remains unused), the logic circuit 1302 can output a signal, e.g., via the communication interface to another device or via one of the I/O devices 1316 (e.g., a speaker, piezoelectric device, display, indicator light, etc.) of the media processing device 100 to indicate that the media is depleted or nearly depleted, and/or can deny or reject instructions for printing and/or encoding media.

FIGS. 1-13 are provided to illustrate an example media processing device and associated components. Other examples may differ from what is described with regard to FIGS. 1-13. The number and arrangement of devices/components shown in FIGS. 1-13 are provided as an example. In practice, there may be additional devices/components, fewer devices/components, different devices/components, or differently arranged devices/components than those shown in FIGS. 1-13. Furthermore, two or more devices/components shown in FIGS. 1-13 may be implemented within a single device/component, or a single device/component shown in FIGS. 1-13 may be implemented as multiple, distributed devices/components. Additionally, or alternatively, a set of devices/components (e.g., one or more devices/components) shown in FIGS. 1-13 may perform one or more functions described as being performed by another set of devices/components shown in FIGS. 1-13.

Figure 14:
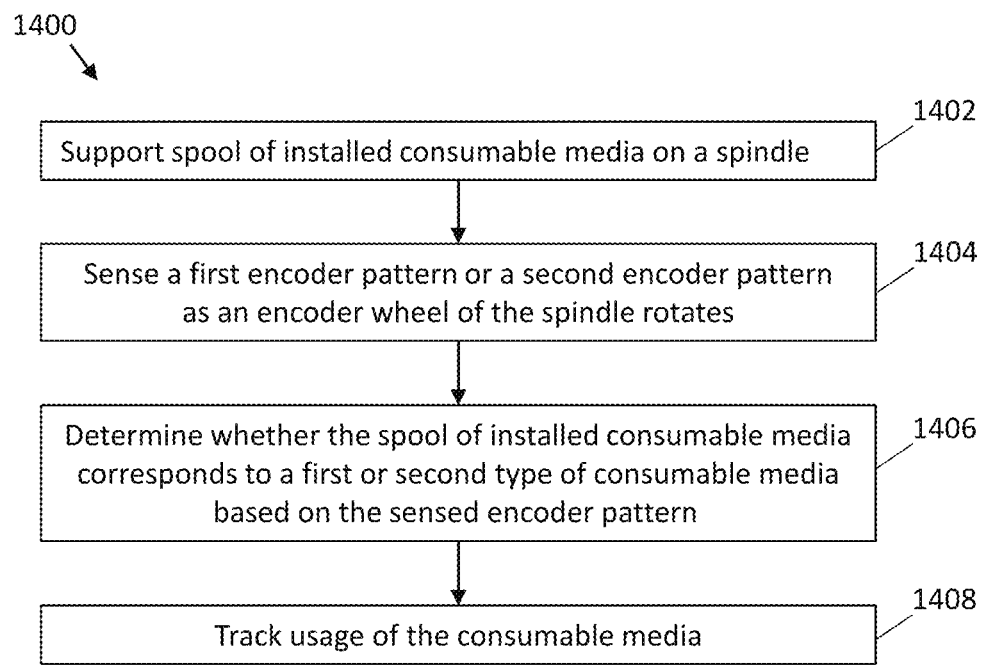
FIG. 14 is a flowchart illustrating an example process in accordance with embodiments of the present disclosure.
Figure 15:
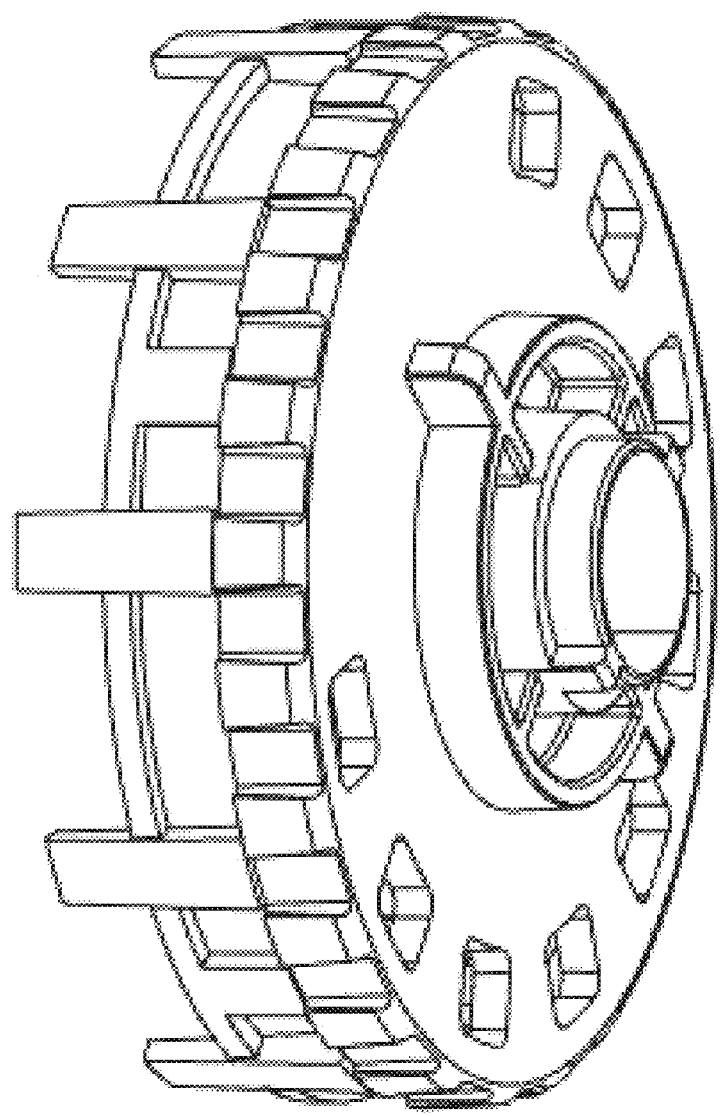
FIG. 15 illustrates a front perspective view of an example encoder wheel in accordance with embodiments of the present disclosure.
Figure 16:
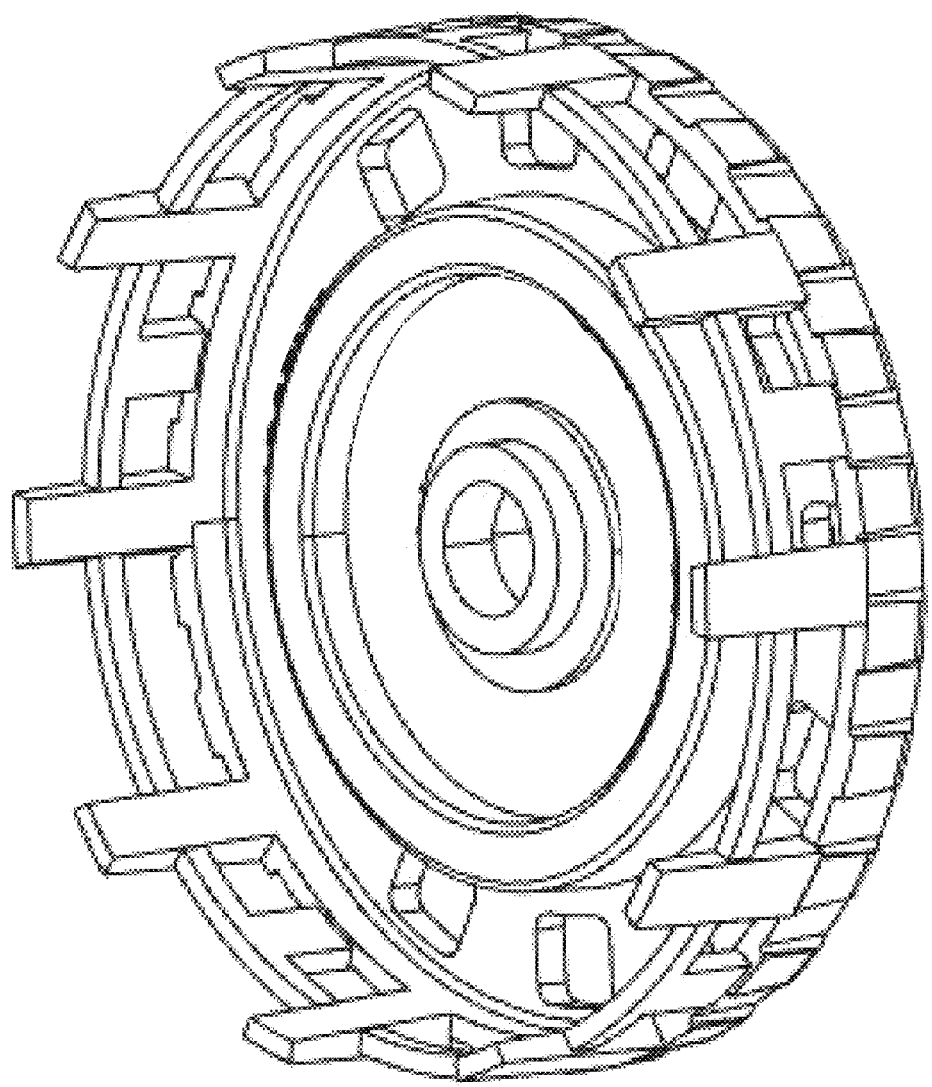
FIG. 16 illustrates a rear perspective view of an example encoder wheel in accordance with embodiments of the present disclosure.
Figure 17:
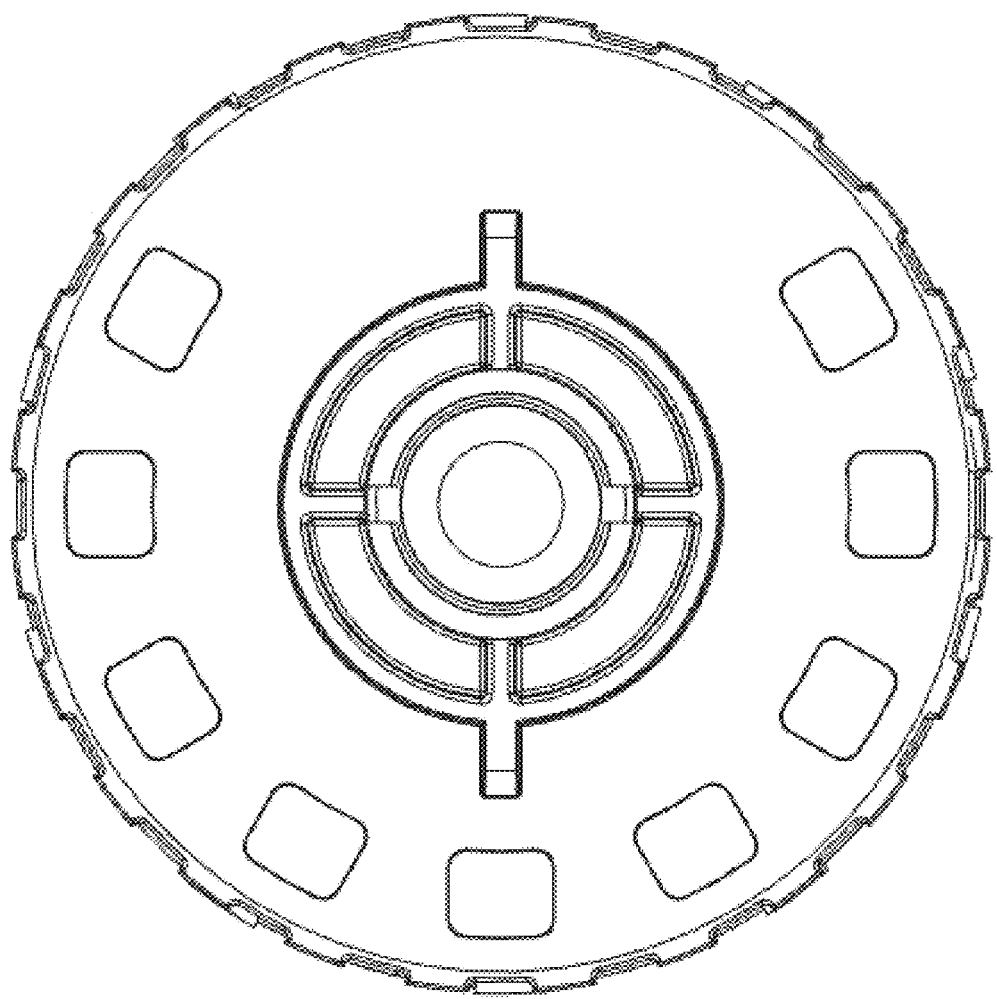
FIG. 17 illustrates a front view of an example encoder wheel in accordance with embodiments of the present disclosure.
Figure 18:
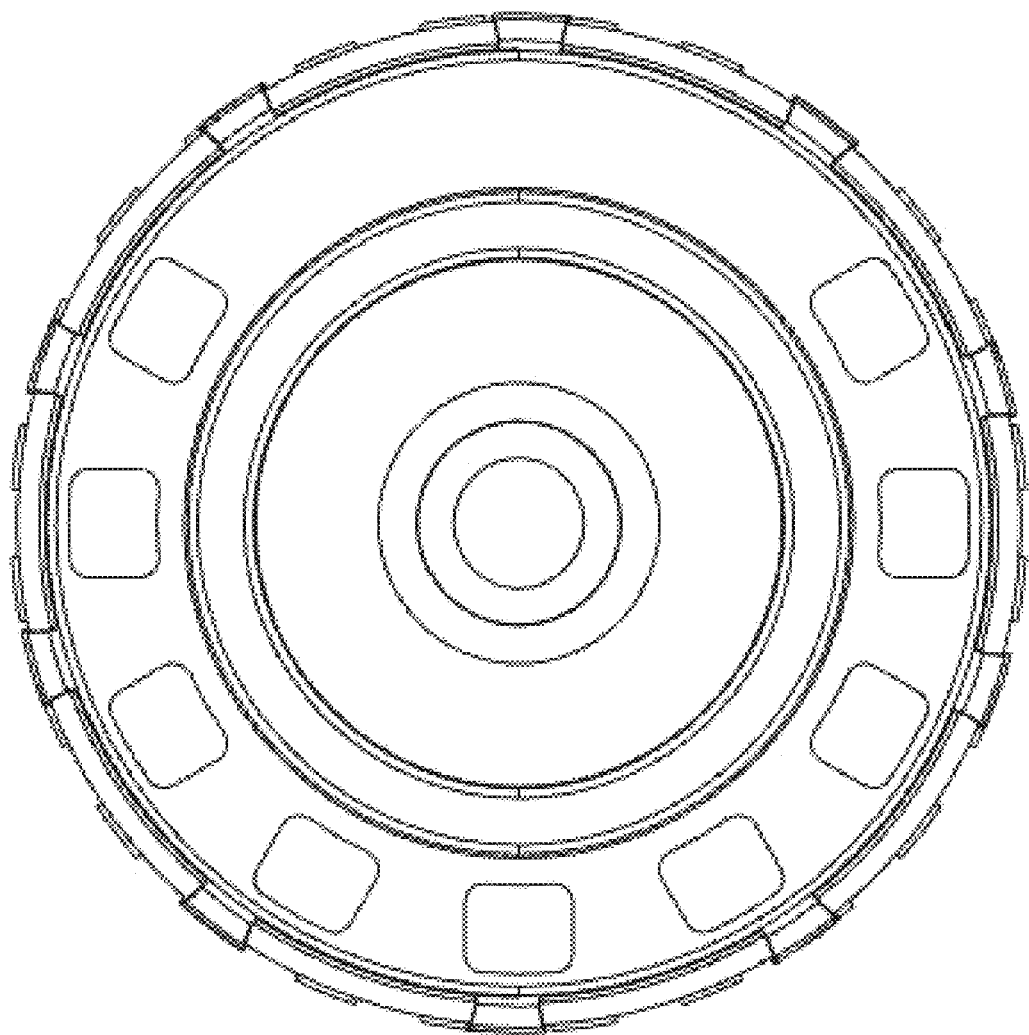
FIG. 18 illustrates a back view of an example encoder wheel in accordance with embodiments of the present disclosure.
Figure 19:
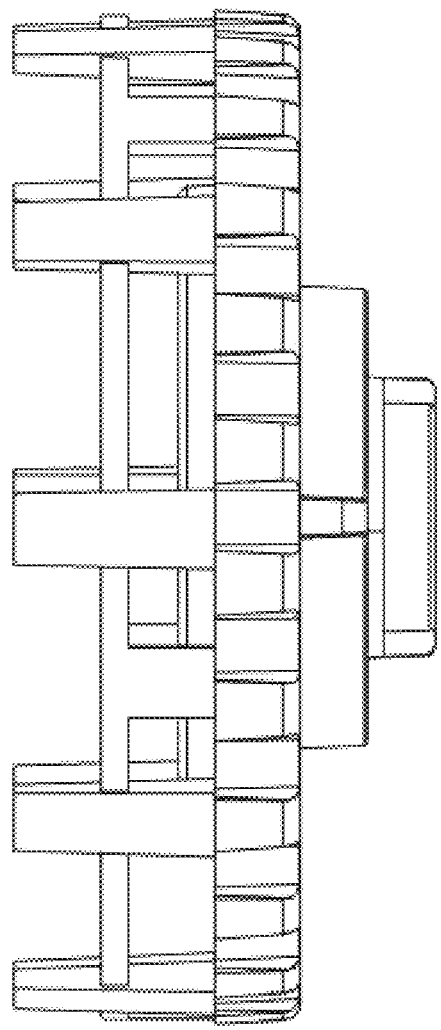
FIG. 19 illustrates a side profile of an example encoder wheel in accordance with embodiments of the present disclosure.
Figure 20:
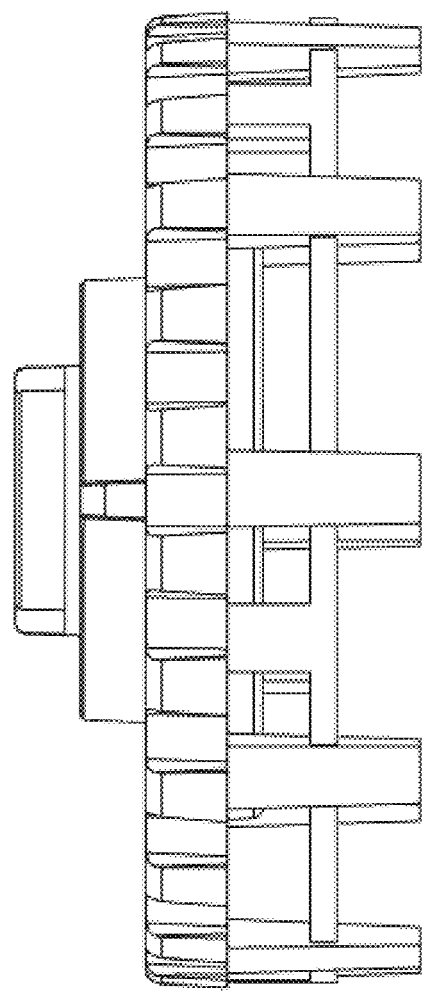
FIG. 20 illustrates another side profile of an example encoder wheel (opposite the side illustrated in FIG. 19) in accordance with embodiments of the present disclosure.

FIG. 14 is a flowchart illustrating an example process 1400 in accordance with embodiments of the present disclosure. At block 1402, a spindle (e.g., spindle 426-1) in a media processing device (e.g., media processing device 100) supports a spool of installed consumable media. The installed consumable media can be selected from different possible types of consumable media. The spindle can include an encoder wheel (e.g., encoder wheel 626) having different encoder patterns. The spindle can be configured to translate in an axial direction to accommodate the different possible types of consumable media. At block 1404, a sensor (e.g., sensor 908) of the media processing device senses at least one of a first encoder pattern of the different encoder patterns based on rotation of the encoder wheel and an axial position of the spindle when a first type of consumable media of the different possible types of consumable media is the spool of installed consumable media or a second encoder pattern of the different encoder patterns based on rotation of the encoder wheel and an axial position of the spindle when a second type of consumable media of the different possible types of consumable media is the spool of installed consumable media. At block 1406, a logic circuit determines whether the first type of consumable media or the second type of consumable media corresponds to the spool of installed consumable media supported by the spindle based on a signal received from the sensor corresponding to the first encoder pattern or the second encoder pattern, and at block 1408, the logic circuit tracks a usage of the consumable media based on the signal.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A media processing device, comprising:
a spindle configured to support a spool of installed consumable media selected from a plurality of different possible types of consumable media, the spindle including an encoder wheel having a plurality of encoder patterns, the spindle configured to translated in an axial direction to accommodate the plurality of different possible types of consumable media;

a sensor configured to sense a first encoder pattern of the plurality of encoder patterns based on rotation of the encoder wheel and a first axial position of the spindle when a first type of consumable media of the plurality of different possible types of consumable media is the spool of installed consumable media and to sense a second encoder pattern of the plurality of encoder patterns based on rotation of the encoder wheel and a second axial position of the spindle when a second type of consumable media of the plurality of different possible types of consumable media is the spool of installed consumable media; and a logic circuit configured to:
receive a signal from the sensor corresponding to the first encoder pattern or the second encoder pattern;
determine whether the first type of consumable media or the second type of consumable media corresponds to the spool of installed consumable media supported by the spindle based on the signal received from the sensor; and
track a usage of the consumable media based on the signal received from the sensor.

2. The media processing device of claim 1, wherein the encoder wheel includes two sets of prongs disposed circumferentially about the encoder wheel and extending axially from the encoder wheel.

3. The media processing device of claim 2, wherein the first encoder pattern is defined by a combination of the first and second prongs and the second encoder pattern is defined by the second prongs.

4. The media processing device of claim 1, further comprising:
a biasing member configured to urge the spindle towards a first axial position.

5. The media processing device of claim 1, wherein the spindle comprises a spool engagement member and the encoder wheel is integrally formed with the spool engagement member.

6. The media processing device of claim 5, wherein the spindle further comprises:
a tensioning member configured to engage the spool engagement member to provide a counterforce that impedes rotation of the spool engagement member;
a first biasing member that urges the tensioning member towards the spool engagement member; and
a second biasing member that urges the spool engagement member towards the tensioning member.

7. The media processing device of claim 6, wherein the tensioning member includes a friction member and the spool engagement member includes a friction surface,
wherein the first biasing member and the second biasing member generate opposing forces to maintain contact between the friction member and the friction surface when the spindle is in the first axial position and the second axial position.

8. The media processing device of claim 1, wherein the logic circuit tracks the usage of the consumable media by estimating a remaining length of the consumable media on the installed spool.

9. The media processing device of claim 1, wherein the consumable media of the installed spool is an ink ribbon.

10. A method, comprising:
supporting, via a spindle in a media processing device, a spool of installed consumable media, the installed consumable media being selected from a plurality of different possible types of consumable media, the spindle including an encoder wheel having a plurality of encoder patterns, the spindle configured to translated in an axial direction to accommodate the plurality of different possible types of consumable media;
sensing, via a sensor of the media processing device, at least one of a first encoder pattern of the plurality of encoder patterns based on rotation of the encoder wheel and an axial position of the spindle when a first type of consumable media of the plurality of different possible types of consumable media is the spool of installed consumable media or a second encoder pattern of the plurality of encoder patterns based on rotation of the encoder wheel and an axial position of the spindle when a second type of consumable media of the plurality of different possible types of consumable media is the spool of installed consumable media;
determining, via a logic circuit, whether the first type of consumable media or the second type of consumable media corresponds to the spool of installed consumable media supported by the spindle based on a signal received from the sensor corresponding to the first encoder pattern or the second encoder pattern; and
tracking, via the logic circuit, a usage of the consumable media based on the signal.

11. The method of claim 10, wherein the encoder wheel includes two sets of prongs disposed circumferentially about the encoder wheel and extending axially from the encoder wheel.

12. The method of claim 11, wherein the first encoder pattern is defined by a combination of the first and second prongs and the second encoder pattern is defined by the second prongs.

13. The method of claim 10, further comprising:
urging, via a biasing member, the spindle towards a first axial position.

14. The method of claim 10, wherein the spindle comprises a spool engagement member and the encoder wheel is integrally formed with the spool engagement member.

15. The method of claim 14, further comprising:
engaging the spool engagement member with a tensioning member to provide a counterforce that impedes rotation of the spool engagement member;
urging, via a first biasing member, the tensioning member towards the spool engagement member; and
urging, via a second biasing member, the spool engagement member towards the tensioning member.

16. The method of claim 15, wherein the tensioning member includes a friction member and the spool engagement member includes a friction surface, and the method further comprises:
generating opposing forces by the first biasing member and the second biasing member generate to maintain contact between the friction member and the friction surface when the spindle is in the first axial position and the second axial position.

17. The method of claim 10, wherein tracking usage of the consumable media comprises:
determining a quantity of revolutions of the installed spool based on the signal; and
estimating a remaining length of the consumable media on the installed spool based on a total length of the consumable media and the quantity of revolutions of the installed spool.

18. A non-transitory computer-readable medium storing instruction that when executed by a logic circuit causes the logic circuit to perform a method comprising:
sensing, via a sensor of a media processing device, at least one of a first encoder pattern of the plurality of encoder patterns based on rotation of the encoder wheel and an axial position of the spindle when a first type of consumable media of the plurality of different possible types of consumable media is the spool of installed consumable media or a second encoder pattern of the plurality of encoder patterns based on rotation of the encoder wheel and an axial position of the spindle when a second type of consumable media of the plurality of different possible types of consumable media is the spool of installed consumable media;

determining whether the first type of consumable media or the second type of consumable media corresponds to the spool of installed consumable media supported by the spindle based on a signal received from the sensor corresponding to the first encoder pattern or the second encoder pattern; and tracking, via the logic circuit, a usage of the consumable media based on the signal.

* * * * *